Sept. 23, 1969    B. CAMOLETTI ET AL    3,468,083
COMPOUNDLY CURVED, SECTIONAL STRUCTURE
Filed July 20, 1966    4 Sheets-Sheet 4

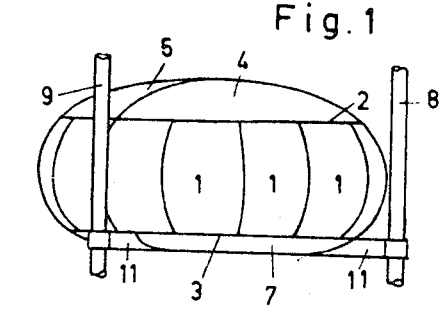
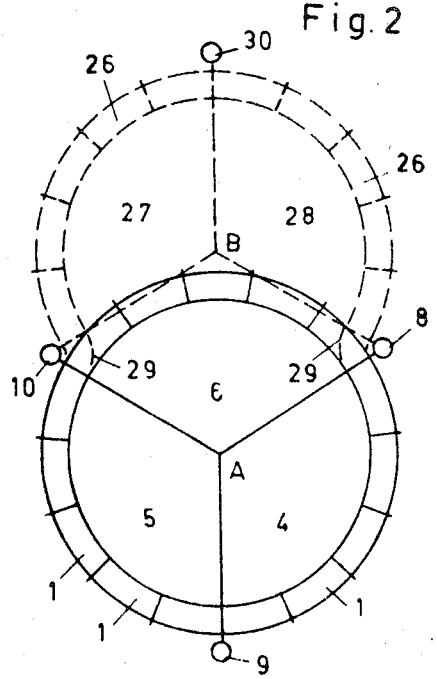
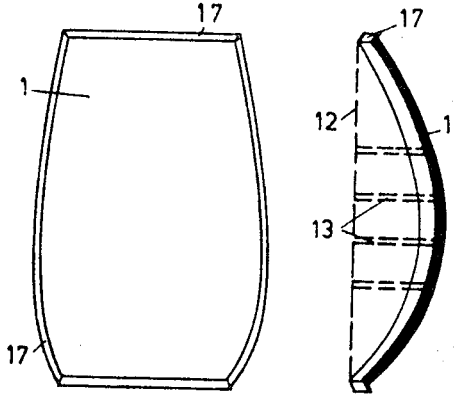
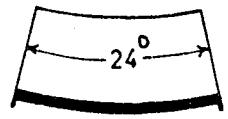
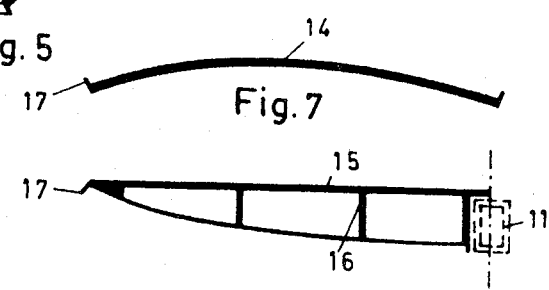
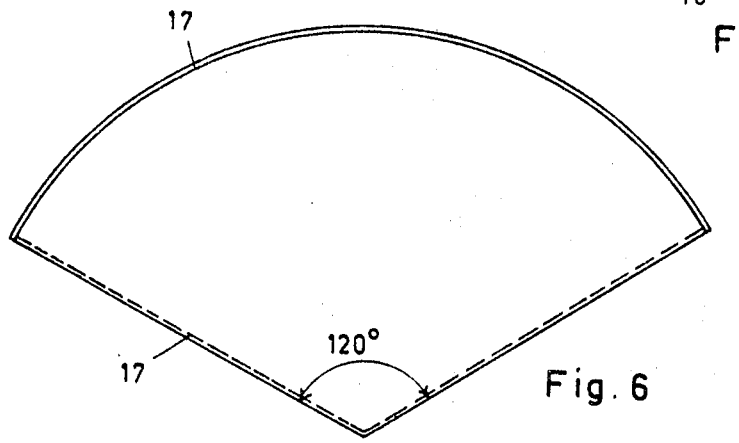

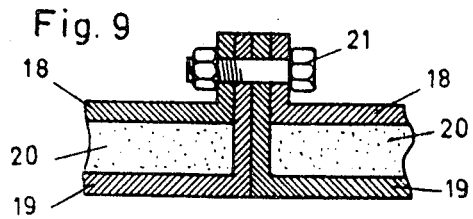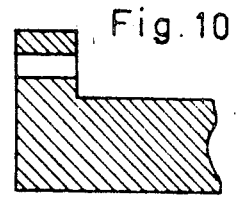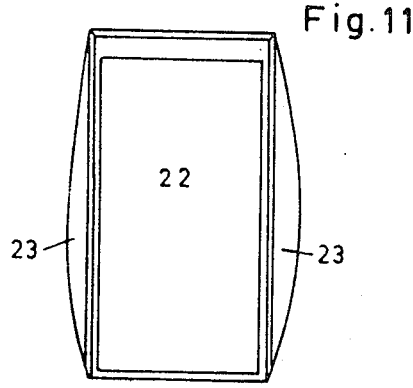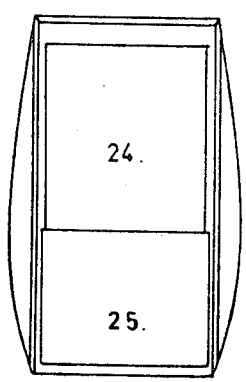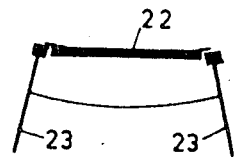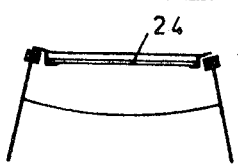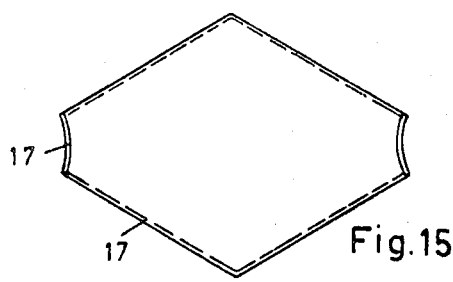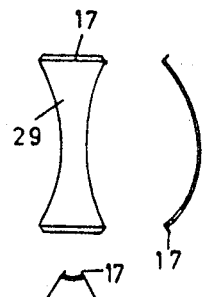

INVENTORS
BRUNO CAMOLETTI
PASCAL HAUSERMANN
BY Young + Thompson
ATTYS

United States Patent Office 3,468,083
Patented Sept. 23, 1969

3,468,083
COMPOUNDLY CURVED, SECTIONAL
STRUCTURE
Bruno Camoletti, Geneva, Switzerland, and Pascal
Hausermann, Minzier, France, assignors to Societe
Sciper S.A., Geneva, Switzerland
Filed July 20, 1966, Ser. No. 566,508
Claims priority, application Switzerland, July 22, 1965,
10,548/65
Int. Cl. E04c 1/24
U.S. Cl. 52—81
1 Claim

ABSTRACT OF THE DISCLOSURE

A prefabricated modular building construction is in the form of a vertically flattened ellipsoid of revolution comprising at least three pillars disposed at the apices of an equilateral triangle. Beams interconnect the pillars in star formation, and floor units are mounted one between each pair of adjacent beams. The sides of the building are convex lunes, and convex sectors cap the assembly.

---

The invention relates to a set of prefabricated elements for the construction of an habitation in the form of an ellipsoid of revolution. The object of the invention does not depend on the scale of construction, so that the invention can be embodied as a toy as well as a really habitable prefabricated house.

The set of elements according to the present invention comprises constitutive elements of an equatorial belt or circle, made up of spherical lune areas enclosing an arc which should be a submultiple of 120° and extending between two parallels and polar cap sectors of 120° exterior to these parallels, some of them being top or roofing sectors and the others ground or flooring sectors, these latter presenting a flat face the other face being provided with ribs included in the cap profile, all these elements being bordered by a band forming a joint-clamp directed on the convex side of the element and the whole sized in such a way that when making an equatorial belt of spherical lune areas surmounted by three roofing cap sectors and laid on three ground cap sectors, one obtains an ellipsoid of revolution, all the constitutive elements of which may be unified through clamping of their joint-clamps applied against each other.

The attached drawings show embodiments of the invention, given by way of example in the case of spherical lune areas of 24°, possible additions and some plans of execution of corresponding habitations.

FIG. 1 is a simplified view of an assembled unit making up an habitation in the form of an ellipsoid of revolution.

FIG. 2 is a corresponding plan view showing moreover how it is possible to enlarge the represented unit.

FIG. 3 is a front view of an equatorial belt element in the form of a spherical lune area of 24°.

FIG. 4 is a cross section thereof half way up (that of the equator).

FIG. 5 is a vertical section thereof (along a meridian).

FIG. 6 is a plan view of a polar cap sector (roofing or ground cap).

FIG. 7 is a radial section corresponding to a roofing cap sector.

FIG. 8 is a similar section corresponding to a ground polar cap sector.

FIG. 9 is a detail section on an enlarged scale, showing how the prefabricated elements may be joined together.

FIG. 10 is a similar section of a portion of an element made of another material as in the case of the preceding figure.

FIGS. 11 and 12 are a view in elevation and a cross section half way up of a spherical lune area of an element forming a door.

FIGS. 13 and 14 are a view in elevation and a cross section half way up of a spherical lune area of an element forming a window.

FIG. 15 is a plan view on a smaller scale of a roofing or ground element making it possible to enlarge the habitation unit of FIG. 1, as represented in broken lines in FIG. 2.

FIG. 16 is a longitudinal section of a roofing enlarging element.

FIG. 17 is an identical section of a ground enlarging element.

FIG. 18 shows, on the same reduced scale, an enlarging equatorial element designed to cooperate with the roofing or ground enlarging element of FIG. 15.

FIG. 19 is a plan view thereof.

FIG. 20 is an axial vertical section thereof.

Figure 21:
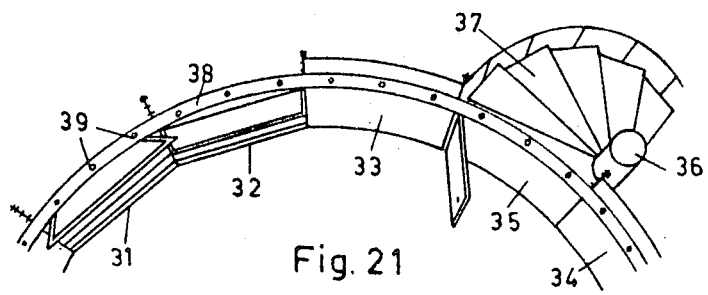
FIG. 21 is a partial top view of an assembled habitation, the top or roofing elements being removed.

The habitation in the shape of an ellipsoid of revolution obtained through assembling various prefabricated elements constituting the set according to the invention, appears diagrammatically from the view in elevation of FIG. 1 and from the full line plan view of FIG. 2.

It is made up of an equatorial belt, made here of fifteen elements 1, having the shape of spherical lune areas of 24° of arc, included between an upper parallel 2 and a lower parallel 3. Above the upper parallel 2 is a top polar cap made up of three cap sectors or roof members 4, 5, 6 of 120°, whilst below three like cap sectors or floor members such as 7, form the bottom or ground polar cap.

The whole rests on three pillars 8, 9, 10 through beams 11 forming a three shank cross extending along the jointing radii of the three ground cap sectors. The shanks of the cross thus form a star having three rays.

The pillars allow a multistoried construction capable in fact of supporting various superposed ellipsoidal units. In the case of a sole unit, three pillar frusta or three legs are sufficient.

As it appears, all the represented elements are convex, with their convexity turned towards the exterior of the habitation thus constituted.

FIGS. 3 to 5 represent more in detail a spherical lune area of the equatorial belt. The cross or horizontal section of FIG. 4 shows that it encloses an arc of 24°, and from this section and the vertical section of FIG. 3 it appears that this part is convex.

Outwardly said element may take the shape only of a convex plate or may also be reinforced laterally by one or two webs forming an inner vertical wall defined by the line 12. This makes it for instance possible to complete the interior of that element by shelvings 13.

In ground-plan, all the polar cap sectors will have the same section, according to FIG. 6, each embracing an angle of 120°.

However, a difference is still extant between the upper top cap and the lower ground cap.

The upper top cap, as is also true of the equatorial belt elements 1, is merely constituted of a convex wall 14, according to the radial section of FIG. 7.

The lower ground cap designed to constitute the habitation bottom or floor, comprises an horizontal flat plate 15 reinforced by ribs 16 projecting on its lower face and imparting to it on the outside, the convex cap profile. The support already referred to is shown at 11.

On the periphery of all the described parts, a band 17 projects outwardly forming, as it will be seen, clamps for interconnecting the various elements, the orientation of these clamps having to be such that those of contiguous elements fit snugly against each other.

Thus, the lateral clamps 17 of the spherical lune areas are directed radially (FIG. 4), while those of the ends cooperating with those of the arc of the cap sectors along the parallels 2 and 3 will form a strongly flattened frustum of a cone. Those extending along joint radii of the cap sectors will be in vertical planes in the assembled state.

All these clamps are directed outward and are visible on the convex side of all the considered elements.

These elements are preferably made of a moulded material, for instance synthetic resin.

The partial enlarged section of FIG. 9 gives an example thereof and illustrates a method of assembling.

The represented elements are made up of two parts, an outer part 18 and an inner one 19, e.g. of stratified polyester, leaving between them a space filled with a filler 20 such as a polyurethane foam.

This figure shows the joint clamps tightened together by means of a bolt 21.

It is of course also possible to execute the elements in one block, without double wall, as appears in the example of FIG. 10, which could be an element of foam epoxy or of another material.

It is evident that the spherical lune areas forming the equatorial belt will not all be full wall elements.

FIGS. 11 and 12 show such a part forming a door 22. In order that the latter may be flat, it fills the bottom of the convex section confined laterally to two radial webs 23, the border zone of which forms at the same time the joint-clamp with the adjacent spherical lune areas. FIGS. 13 and 14 show likewise how to incorporate a bay 24 within a spherical lune area. It may be a window of any type which is mounted in an aperture above a solid part 25.

It is of course conceivable to build a unit with less than fifteen spherical lune areas, i.e. by leaving gaps between such parts which communicate directly with the exterior, for instance with a raised terrace.

As to the proportions of the whole, it may be noted that the height of the spherical lune areas will be about two thirds of the total height of the ellipsoid.

By means of the addition of some so-called enlarging elements, the ellipsoidal unit already described may be enlarged radially or linearly or by combinations of these two possibilities. The plan view of FIG. 2 shows the simplest possibility of a linear enlargement: two units in a row are mutually interpenetrating on one third of their periphery.

Therefore, the unit placed in front on the drawing, in full line, will comprise no more than ten spherical lune areas 1 and two top sectors 4 and 5, as well as the corresponding ground sectors, thus covering a surface of 240° of the whole. Opposite this will be a second unit (in broken lines) comprising ten spherical lune areas 26 and two top sectors 27 and 28 with the corresponding ground or bottom sectors.

As can be seen, there is then between these two partial units a top and ground gap in the form of a rhombus with its major axis joining the pillars 8 and 10 and its minor axis joining the centers A–B. In the equatorial belt forming the lateral wall of the whole, which, in plan appears as an eight, two elements 29 are omitted, one adjacent each pillar 8 and 10. Finally, it is noteworthy that a fourth pillar 30 is necessary.

FIG. 15 represents, to a reduced scale, the plan view of the top or ground enlarging element filling the rhombus shaped space 8A–10B.

FIG. 16 is a section thereof on the major axis in the case of the roofing and FIG. 17 the same section in the case of the ground. Therein are again the joint-clamps 17 common to all the elements.

As to the lateral or equatorial enlarging element 29, it is shown in elevation in FIG. 18, in plan in FIG. 19 and in vertical section in FIG. 20 and comprises also joint-clamps 17. Said equatorial belt enlarging element is in the shape of an hyperbolical sector.

It will further be seen (FIGS. 22 to 25) that these enlarging elements lend themselves to the required developments.

FIG. 21 shows a plan view the top elements being removed, of a portion of an assembled habitation.

At 31 and 32 are the spherical lune areas with windows, open at 31 and shut at 32. The references 33 and 34 designate spherical lune areas with solid walls.

Between them, at 35, is a door element, located immediately beside a pillar 36 used at the same time as support for a stair-case 37.

Finally, at 38 appears the circular band or strip made of the upper joint-clamps of the equatorial belt of assembled spherical lune areas and on which the top cap sectors will be placed. The holes 39 are used as passages for the jointing bolts.

Figure 22:
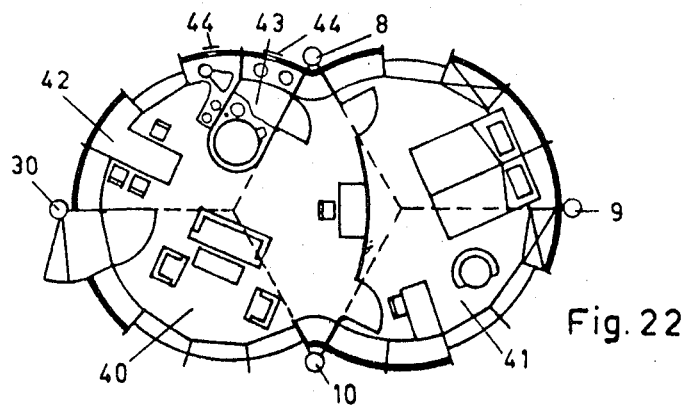
FIG. 22 is a plan of an enlarged habitation unit.

The plan of FIG. 22 shows the possible inner arrangement of two partial units in a row as in FIG. 2. Therein, appear four pillars 8, 9, 10 and 30, this latter being used as a staircase support. At 40 is a living-room, at 41 a bedroom, at 42 the "kitchen corner" and at 43 are the lavatories and washstands with ventilating holes 44. The broken line indicates the already described manner of assembling.

Figure 23:
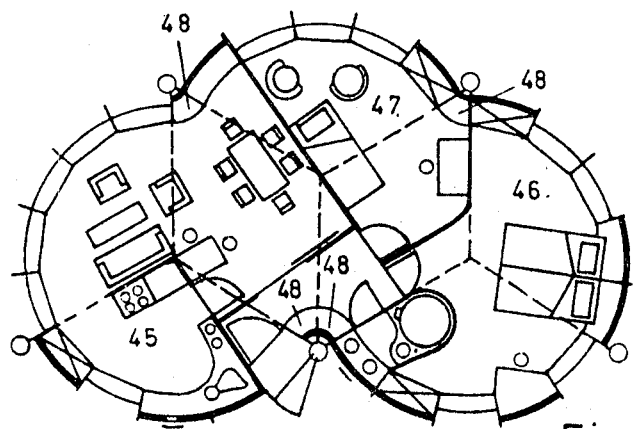
FIG. 23 is an analogous plan comprising two assembled units with an intermediate enlarging part.

The more complete arrangement of FIG. 23 makes use of ten spherical lune areas and of two top and ground sectors in the left-hand wing 45 and right-hand wing 46, of five spherical lune areas and a top and ground sector at 47, the surplus being completed, as can be seen, by two pair of rhombus or diamond shaped enlarging elements and four lateral enlarging elements 48, two of which form an assembled pair. There are in all five pillars.

Figure 24:
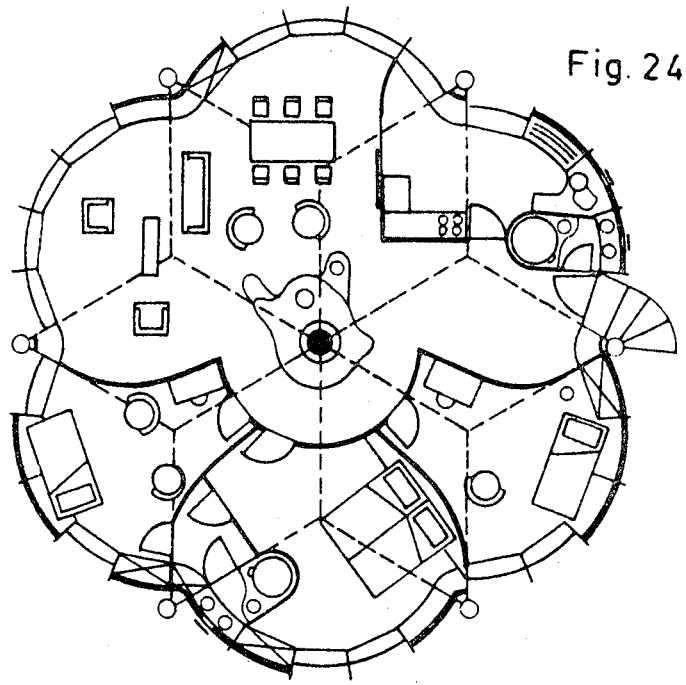
FIG. 24 is another plan comprising six partial units assembled by enlarging elements.

By starlike setting, with great axes directed radially, of six diamond shaped top and ground enlarging elements and completing their plan with six top and ground cap sectors, one obtains the arrangement according to FIG. 24, comprising moreover thirty spherical lune areas, six lateral enlarging elements and six pillars.

Figure 25:
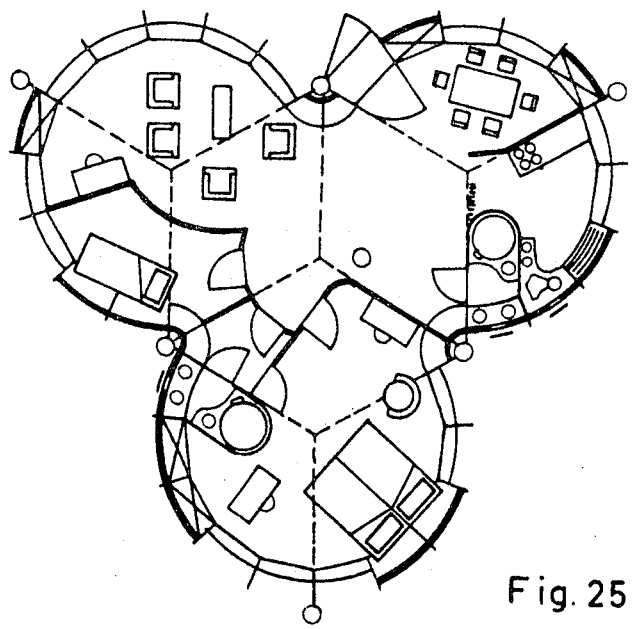
FIG. 25 represents a block of three joined units.

With a like number of spherical lune areas and pillars, the plan according to FIG. 25 will still be achieved, but using on the other hand only three top, ground and lateral enlarging elements, but twice as many top and ground sectors.

Such examples could be multiplied ad infinitum.

It is obvious that, according to the diameter of the habitation, the spherical lune areas could be, for instance, four in number per cap sector (30° each), or on the contrary six (20° each) or still more.

It is finally noteworthy that the transport to the construction site of such elements involves no problem as well as their mounting which consists merely in a bolting with interposition of joints.

The mentioned building materials are not limitative, any material suitable for the execution of the described parts being utilizable, as for example, concrete, wood pellicles, etc. and within the frame of the present invention.

Also noteworthy is that the reinforcing ribs of the parts making up the ground or bottom (see FIG. 8) could perfectly well have their edges united between them, so as to form caissons capable of receiving sewage etc. and of containing objects or contrivances accessible through traps.

Finally, by making the habitation perfectly watertight, nothing prevents making a floating house thereof.

What we claim is:

1. A habitation having portions in the shape of partial ellipsoids of revolution, comprising at least four pillars disposed at the apices of a rhombus having a major axis and a minor axis, two sets of horizontal beams disposed one set on each side of said minor axis, each said set of horizontal beams being joined at corresponding ends substantially at the midpoint of the area defined by the triangle which is defined by the three said pillars most closely adjacent said midpoint, said beams radiating outwardly from said midpoint toward said pillars and being joined at their outer ends each to one of said pillars, a plurality of floor members each supported between an adjacent pair of said beams, a further floor member in the form of a second rhombus whose major axis coincides with the minor axis of said first-named rhombus, equatorial belt elements in the shape of convex lunes joined at their lower edges to said floor members, and roof members joined to the upper edges of said lunes and overlying and having the same shape in plan as said floor members.

References Cited

UNITED STATES PATENTS

| | | | |
|---|---|---|---|
| 2,278,956 | 4/1942 | Wagner | 52—237 |
| 3,212,220 | 10/1965 | Bonikecki | 52—80 |
| 2,705,349 | 4/1955 | Shaw | 52—81 |
| 2,918,992 | 12/1959 | Gelsavage | 52—81 |
| 3,363,370 | 1/1968 | Camoletti | 52—80 |

FOREIGN PATENTS

| | | |
|---|---|---|
| 587,690 | 11/1959 | Canada. |
| 1,118,999 | 6/1956 | France. |
| 1,269,321 | 7/1961 | France. |
| 144,913 | 6/1920 | Great Britain. |
| 517,548 | 1940 | Great Britain. |

OTHER REFERENCES

Architectural Forum, April 1952, p. 151.

HENRY C. SUTHERLAND, Primary Examiner

U.S. Cl. X.R.

52—82, 237